(12) United States Patent
Fujita et al.

(10) Patent No.: US 6,618,543 B1
(45) Date of Patent: Sep. 9, 2003

(54) OPTICAL DEVICES MADE WITH VACUUM-BAKED FILMS

(75) Inventors: Hideaki Fujita, Nara (JP); Yorishige Ishii, Yamatotakada (JP); Toshihiro Tamura, Nara (JP); Yukio Kurata, Tenri (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/539,385

(22) Filed: Mar. 31, 2000

(30) Foreign Application Priority Data

Mar. 31, 1999 (JP) .......................................... 11-090528
Jul. 9, 1999 (JP) .......................................... 11-195388

(51) Int. Cl.[7] ............................................. G02B 6/10
(52) U.S. Cl. ..................... 385/143; 385/130; 427/163.2
(58) Field of Search ................... 385/129–132, 385/143; 427/162, 163.2

(56) References Cited

U.S. PATENT DOCUMENTS

| | | | | |
|---|---|---|---|---|
| 4,582,390 A | * | 4/1986 | Furuya .......................... | 385/131 |
| 4,748,228 A | * | 5/1988 | Shoji et al. .................... | 528/182 |
| 5,054,872 A | * | 10/1991 | Fan et al. ..................... | 385/130 |
| 5,317,082 A | * | 5/1994 | Beuhler et al. .............. | 385/123 |
| 5,578,360 A | * | 11/1996 | Viitanen ....................... | 428/138 |
| 5,598,501 A | * | 1/1997 | Maruo et al. ................ | 385/143 |
| 5,733,481 A | * | 3/1998 | Hayashida et al. .......... | 252/582 |
| 6,100,365 A | * | 8/2000 | Matsumoto et al. ......... | 528/170 |

FOREIGN PATENT DOCUMENTS

JP 4-9807 1/1992

* cited by examiner

Primary Examiner—John D. Lee
Assistant Examiner—Sarah U Song
(74) Attorney, Agent, or Firm—Birch, Stewart, Kolasch & Birch, LLP

(57) ABSTRACT

A method for producing an optical device having a polyimide film through which a light beam is transmitted, which comprises applying a solution containing a polyamic film-forming starting material on a substrate and then baking the resultant under vacuum to form the polyimide film.

10 Claims, 8 Drawing Sheets

OPTICAL DEVICES MADE WITH VACUUM-BAKED FILMS

CROSS-REFERENCES TO RELATED APPLICATIONS

This application is related to Japanese patent applications No. Hei 11(1999)-195388 filed on Jul. 9, 1999 and No. Hei 11(1999)-090528 filed on Mar. 31, 1999, whose priorities are claimed under 35 USC §119, the disclosure of which is incorporated herein by reference in its entirety.

TECHNICAL FIELD OF THE INVENTION

The present invention relates to an optical device capable of making it compact and a method for producing the same, and to a method for producing a polyimide film.

BACKGROUND OF THE INVENTION

With the practice in the variety of mobile electronic appliances and network equipments, further development for a more compact and lightweight optical device having a higher performance is required. Main types of conventionally known optical devices include, firstly, an optical waveguide formed on a substrate as an optical device for communication or the like, and secondly, a bulk-type optical device comprising a combination of various types of optical components.

The optical waveguide referred above requires that the light loss is small, that it is easily produced, that the difference in refraction index between the core layer and the clad layer is controllable, that it has excellent heat resistance, etc. However, since a quartz based optical waveguide require a process at a temperature as high as 1,000° C. or even higher, there are such problems that the substrate on which the optical waveguide is formed is limited, and that the waveguide cannot be formed after the optical components are mounted on the substrate.

In the case of optical communication systems using a plastic optical fiber (POF) as the transmission medium, which is recently attracting attention, a thick film optical waveguide capable of being efficiently connected with a large POF having a diameter of about 1 mm is necessary. However, it is difficult to obtain thick films of a quartz based optical waveguide due to the problems encountered in their production.

On the other hand, many are interested in the recently proposed plastic optical waveguide, because it enables waveguides at lower temperatures, and thick films thereof are relatively easily achieved. A polyimide optical waveguide using polyimide, which boasts the highest heat resistance among the plastics, can be generally produced by a method as follows:

(1) producing a thin film of polyimide by coating a substrate with a solution of polyamic acid or polyimide by means of, for instance, spin coating, and then heating it remove the solvent by volatilization; and (2) obtaining a polyimide optical waveguide by patterning the resulting thin film into a desired shape by means of, for example, dry etching using gaseous oxygen.

In the case of an optical device using such as POF as the transmission medium, the loss increases in the wavelength region of from about 600 nm to 800 nm. Thus, in a practical application, it is necessary to minimize the loss. Accordingly, in JP-A-Hei4-9807 (the term "JP-A-" as referred herein signifies "an unexamined published patent application") is proposed a polyimide optical waveguide having a lower loss. The proposed method provides a polyimide having reduced loss by fluorinating the diamine which constitutes the polyimide.

However, the production process for the plastic optical waveguide above had disadvantages that the resulting polyimide optical waveguide exhibits a tanned color characteristic of polyimide; an optical waveguide having low loss was thereby unfeasible.

A fluorinated polyimide disclosed in JP-A-Hei4-9807 was so expensive that an optical device using such a material also suffered a disadvantage of increased cost. Furthermore, in case of processing the polyimide by means of dry etching using gaseous oxygen, the polyimide was found unsuitable for use as a mask, because the selective ratio between the polyimide and a positive resist using novolak based resin was so small, and this inevitably required the use of, for example, silicon oxide, aluminum, etc. This also led to a problematic increase in production cost due to the need of a complicated production process. Although there is known a method of simplifying the production process comprising using a polyimide having a photosensitive group (a photosensitive polyimide), the application of such photosensitive polyimides to optical devices is not studied heretofore because such polyimides undergo coloring upon baking.

As described above, in a plastic optical waveguide heretofore using a polyimide or a like organic polymer, which is relatively easy to obtain thick films therefrom, it has been found difficult to achieve both high performance and low cost at the same time due to the absorption of the core material or to the large optical loss caused by the scattering at the interface between the core and the cladding. Furthermore, it has been found difficult to obtain the final products at a low cost due to the complicated production process.

SUMMARY OF THE INVENTION

In the light of the aforementioned circumstances, the present invention has been accomplished in order to solve the problems above. Accordingly, an object of the present invention is to provide a low cost optical device which can be easily made compact and lightweight, and to provide a method for producing the same.

The present inventors have found that a polyimide film having high transmittance can be achieved by forming a coating of a polyimide or photosensitive polyimide on a substrate, and by then baking it in vacuum. This allows a low cost optical device yet having high performance by etching the film into a desired shape.

Thus, in accordance with an aspect the present invention, there is provided a method for producing an optical device having an organic polymer film through which a light beam is transmitted, which comprises applying a solution containing an organic polymer film-forming starting material on a substrate to form the applied film and then baking the applied film under vacuum to form the organic polymer film.

PREFERRED EMBODIMENTS OF THE INVENTION

In the present invention, a polyimide, for example, may be mentioned as a polyimide type resin of an organic polymer usable for forming the organic polymer film. The polyimide may have a photosensitive group and may further contain another organic polymer which does not prevent the passage of the light beam.

In the case where the organic polymer is a polyimide, a precursor of the polyimide such as polyamic acid may be mentioned as the above-mentioned organic polymer film-forming starting material. The precursor changes to the polyimide by ring closure with dehydration at baking.

Furthermore, the method of the present invention is characterized by that the baking is performed under a vacuum degree of 1 Torr or lower.

In accordance with a further other aspect of the present invention, there is provided an optical device having on a substrate an organic polymer film through which a light beam is transmitted, wherein the organic polymer film is formed by applying a solution containing an organic polymer film-forming starting material on the substrate and then baking the resultant under vacuum. Here, the organic polymer film has preferably a thickness not less than 5 $\mu$m and not more than 200 $\mu$m.

In case that the organic polymer film is a photosensitive polyimide film, it is preferable to be able to transmit a light beam having a wavelength of 1.5 $\mu$m or shorter. Furthermore, in case that the organic polymer film is a polyimide film, it is preferable to be able to transmit a light beam having a wavelength of 500 to 800 nm.

According to still other aspect of the present invention, there is provided an optical device having an optical waveguide for sending light to or receiving light from a plastic optical fiber, wherein the optical waveguide includes a core made of an organic polymer film, the organic polymer film being formed by applying a solution containing an organic polymer film-forming starting material on a substrate and then baking the resultant under vacuum.

According to a yet other aspect of the present invention, there is provided a method for producing a polyimide film, which comprises applying a solution containing a polyimide film-forming starting material on a substrate and then baking the resultant under vacuum to form the. polyimide film.

The process for forming an optical waveguide according to the present invention is described in further detail by making reference to preferred embodiments below.

First Embodiment

The first embodiment refers to a case in which a polyimide film and a method for producing the same according to the present invention is applied to an optical waveguide. In the explanation below, the polyimide refers to a case in which an acid dianhydride and diamine as the starting materials are not fluorinated.

Figure 1A:
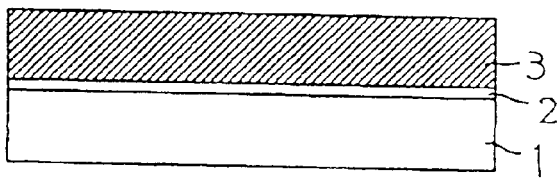
FIGS. 1(a) to 1(g) are schematic sectional views showing a method of producing an optical waveguide according to an embodiment of the present invention.
Figure 1B:
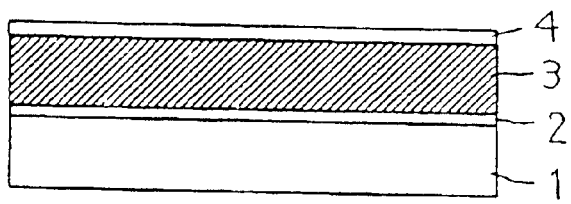
Figure 1C:
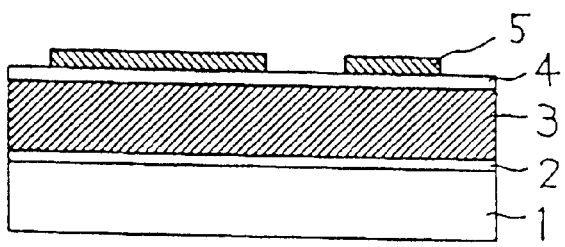
Figure 1D:
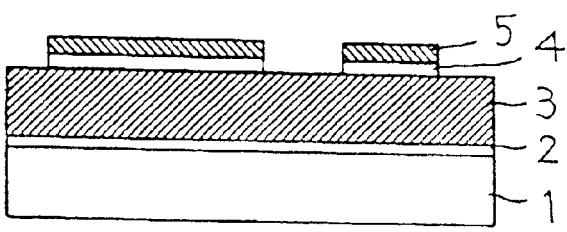
Figure 1E:
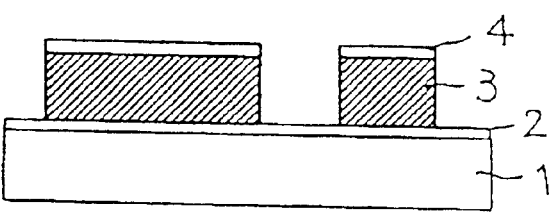
Figure 1F:
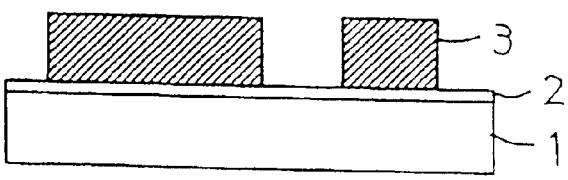
Figure 1G:
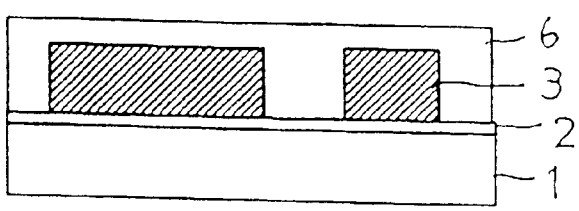

FIGS. 1(a) and 1(g) are schematic sectional views showing the method of producing the optical waveguide according to the first embodiment of the present invention. The method for producing the polyimide optical waveguide is described below by making reference to FIGS. 1(a) to 1(g).

(1) First, a substrate 1 made of Si or the like, whose surface is covered with a silicon oxide or organic polymer film provided as a buffer layer 2, is coated with a core layer 3 by applying an organic solvent solution of a polyimide (i.e., a polyamic acid that is the precursor thereof) having a refractive index higher than the buffer layer 2 by spin coating, and a part of the organic solvent is volatilized and removed therefrom by prebaking the coating in air. Thus, the core layer 3 made from a polyimide film is finally obtained by baking the resulting coat under vacuum to volatilize the organic solvent and carry out imidization (FIG. 1(a)).

(2) An etching mask 4 for the core layer 3 is provided by depositing a film of copper, aluminum, silicon oxide, etc., by means of, for example, sputtering (FIG. 1(b)).

(3) After coating a photoresist 5, patterning thereof is performed by means of a photolithographic process (FIG. 1(c)).

(4) A mask pattern is transferred to the etching mask 4 by means of dry etching or wet etching (FIG. 1(d)).

(5) The core layer 3 is etched by means of reactive ion etching (RIE) using gaseous oxygen (FIG. 1(e)).

(6) The, etching mask 4 is removed by wet etching and the like (FIG. 1(f)).

(7) An over cladding 6 is formed by coating an organic polymer having a refractive index lower than that of the core layer 3 by means of spin coating, followed by baking (FIG. 1(g)).

In the optical waveguide above, the core layer 3 having a high refractive index and made of a polyimide film is interposed between the buffer layer 2 and the over cladding layer 6 both lower in refractive index, and hence, a guided light wave is transmitted inside the waveguide, being confined in the core layer 3.

Accordingly, the polyimide film constituting the core layer 3 preferably has a higher transmittance for a light having the desired wavelength (the wavelength of the light waveguided through the waveguide). Since a polyimide obtained by using fluorinated acid dianhydride or diamine generally yields a higher transmittance for the light in the wavelength region ranging from visible to near infrared regions, it is attracting much attention as a device material suitable for optical communication, but is expensive. However, even in case of using a low cost polyimide (the polyimide according to the present invention), it is possible to increase the transmittance thereof by carrying out the baking (imidization) under vacuum.

The relation between the baking conditions of polyimide and the transmittance thereof is explained below. A commercially available polyimide, PIX-3400 (trade name) manufactured by Hitachi Chemical Co, Ltd., was applied to a glass substrate 0.55 mm in thickness by spin coating to obtain a pre-baked film 25 $\mu$m in thickness. The film was obtained by baking under conditions as follows:

(Condition A) Baking at 350° C. in air for 1 hour (Condition B) Baking at 350° C. under gaseous nitrogen for 1 hour (Condition C) Baking at 350 ° C. under vacuum of $1 \times 10^{-2}$ Torr for 1 hour In the baking above, prebaking was performed at 130° C. by using a hot plate in air for 5 minutes after spin coating. Baking was carried out from 100° C. at a heating rate of 3° C./min.

Figure 2:
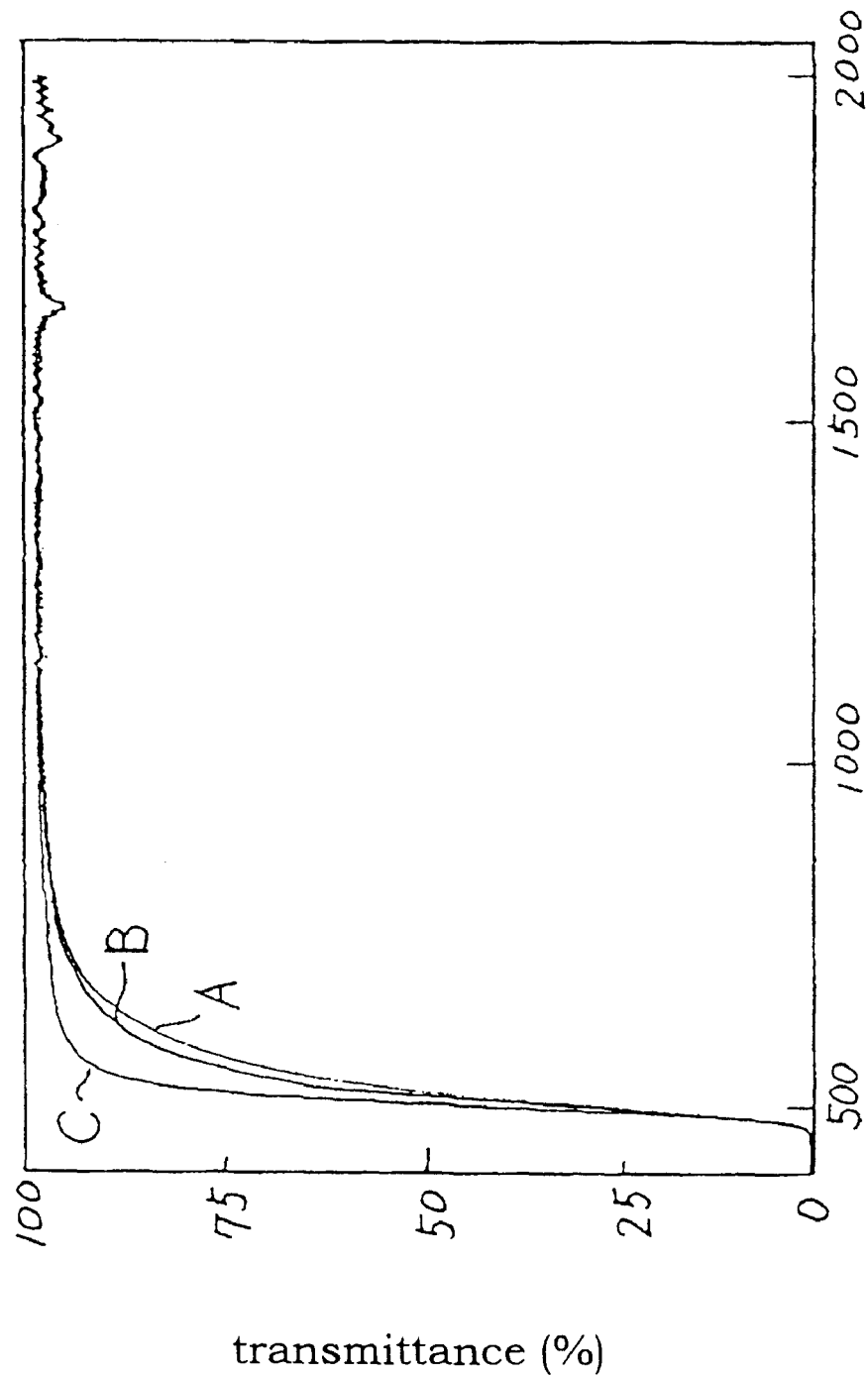
FIG. 2 is a graphical representation showing the wavelength dependence of the transmittance of polyimide samples baked under the conditions A to C.

The wavelength dependence of transmittance was measured on each of the samples prepared under the conditions above by using UV365A manufactured by Shimadzu Corporation. The results are shown in FIG. 2. The same glass substrate was used as the reference material.

It can be understood from the results that the transmittance for a light 1 μm in wavelength is improved for the samples in the order of the conditions A, B, and C. In particular, the transmittance of a sample prepared under the condition C is distinguished for a light in the wavelength region of 500 to 800 nm, from the conditions A and B. For instance, for a light 650 nm in wavelength generally used in optical communication using POF as the transmission medium or in optical disk devices such as a DVD, a transmittance of 89%, 91%, and 96% were obtained for the samples prepared under the conditions of A, B, and C, respectively.

As described above, polyimide films having the same composition but differing in transmittance can be obtained depending on the baking condition, and a polyimide film having high transmittance can be obtained by baking under vacuum. In case of a light from 500 to 800 nm in wavelength, in particular, the polyimide films formed under the conditions A and B above were found practically unfeasible for optical devices which transmit light due to their low transmittance for the light in the wavelength band range above. However, a polyimide film sufficiently high in transmittance for practical application can be obtained by preparing the polyimide film by baking under the condition C in vacuum.

As described in an embodiment according to the present invention, the transmittance of the film can be improved by baking the pre-baked film in vacuum, and hence, optical waveguides and optical devices having low loss can be obtained at a low cost.

The production process described in the embodiment according to the present invention is provided only as an example, and modifications of the process are acceptable so long as the baking of polyimide is carried out in vacuum. Thus, for instance, the polyimide film may be patterned by using any process other than RIE, or a partially modified process can be used. Furthermore, other optical elements such as prisms and lenses can be fabricated by applying a similar process.

Second Embodiment

Figure 3A:
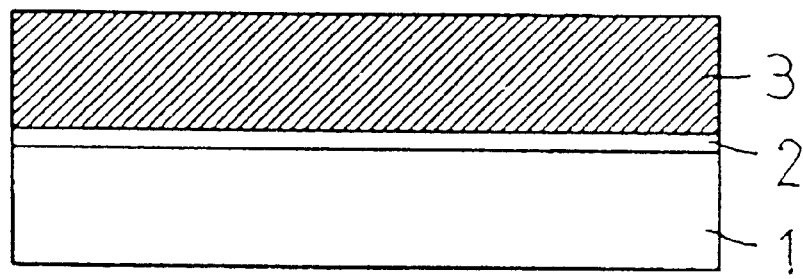
FIGS. 3(a) to 3(c) are schematic sectional views showing a method of producing a polyimide optical waveguide using a photosensitive polyimide according to a second embodiment of the present invention.
Figure 3B:
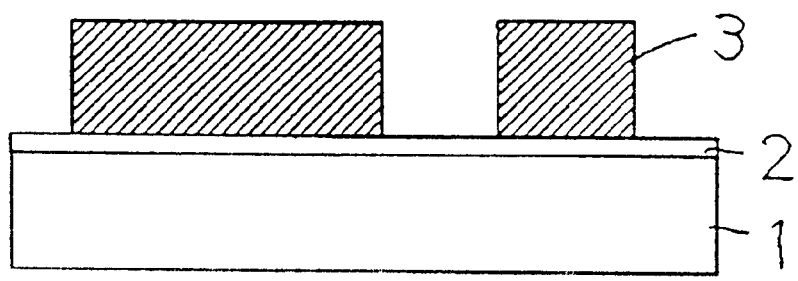
Figure 3C:
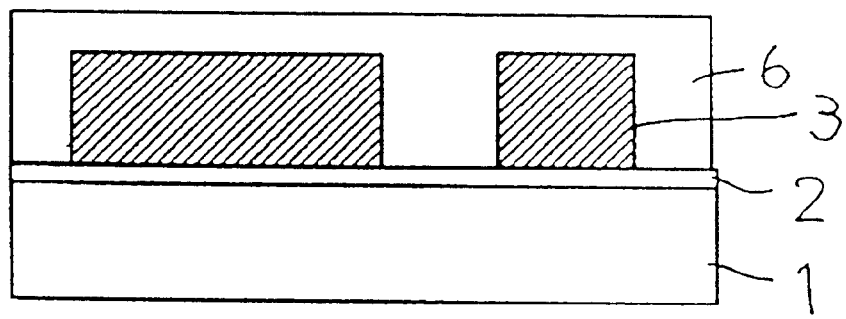

FIGS. 3(a) to 3(c) are schematic sectional views showing a method of producing a polyimide optical waveguide using a photosensitive polyimide according to a second embodiment of the present invention. Referring to FIG. 3, the process for fabricating a polyimide optical waveguide is described below. In FIGS. 3(a) to 3(c), the same constituents as those shown in FIGS. 1(a) to 1(c) are referred by the same numerals.

(1) A substrate 1 made of Si or the like, whose surface is covered with a silicon oxide or organic polymer film provided as a buffer layer 2, is coated with a core layer 3 by applying a solution in an organic solvent of photosensitive polyimide (i.e., polyamic acid that is the precursor thereof) having a refractive index higher than the buffer layer 2 by spin coating, and a part of the organic solvent is volatilized and removed therefrom by prebaking the coating in air (FIG. 3(a)).

(2) The core layer is patterned by means of a photolithographic process using a desired mask pattern (FIG. 3(b)).

(3) By performing baking under vacuum, the organic solvent is volatilized at the same time with imidization.

(4) An organic polymer having a refractive index lower than that of the core layer 3 is applied and baked to obtain an overcladding 6 (FIG. 3(c)).

In the optical waveguide above, the core layer 3 having a high refractive index and made of a polyimide film is interposed between the buffer layer 2 and the overcladding layer 6 both having a lower refractive index. In this manner, the wave guided light is confined inside the core layer 3 and guided through the waveguide.

The fabrication process described in the embodiments according to the present invention is characterized by that the baking of photosensitive polymide is carried out under vacuum, and the process above is shown only as an example. Accordingly, a part of the process may be employed; for instance, the step of coating the overcladding 6 may be omitted to use air as the overcladding. Furthermore, other optical elements such as prisms and lenses can be fabricated in the same manner by applying a similar fabrication process; likewise, the devices above may be fabricated integrally on the same substrate.

By using a photosensitive polyimide as described in the embodiment above, a polyimide optical waveguide and optical devices can be fabricated by a further simplified process than that shown in the first embodiment of the present invention. In general, a photosensitive polyimide material heretofore yielded a lower light transmittance as compared with an ordinary polyimide due to coloring during baking, and was therefore unfeasible for an optical material. However, as shown in the first embodiment according to the present invention, the transmittance thereof can be greatly improved by carrying out the baking under vacuum.

Figure 4:
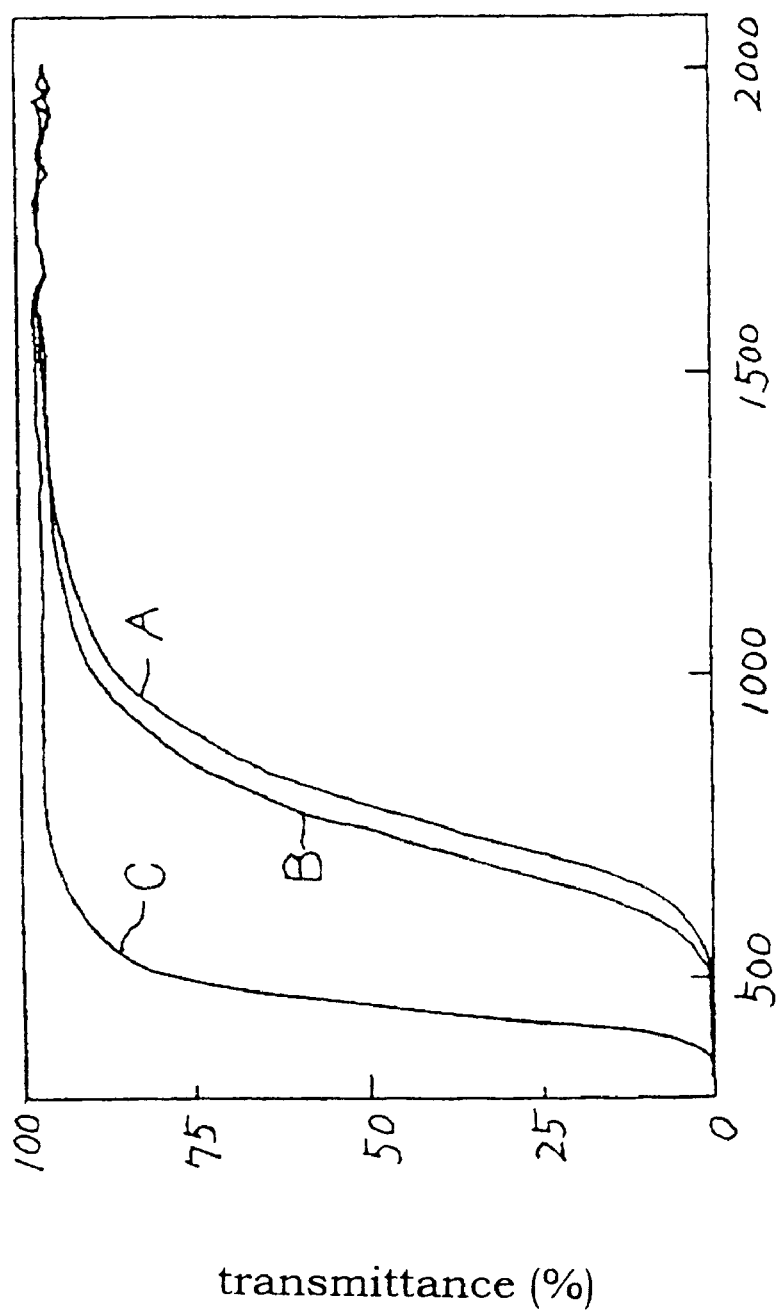
FIG. 4 is a graphical representation showing the wavelength dependence of the transmittance of photosensitive polyimide samples baked under the same conditions A to C.

In FIG. 4 is shown the measured results on the wavelength dependence of the transmittance of a photosensitive polyimide (trade name HD-6100, manufactured by Hitachi Chemical—Dupont Microsystems Co. Ltd.) baked under the same conditions A to C as used in the first embodiment. It can be seen that the transmittance differs depending on the baking condition of the photosensitive polyimide, and is that the transmittance for the light 1.5 μm or less in the wavelength region (particularly for the light 400 nm to 1.2 μm in wavelength) is far higher for the polyimide baked under the condition C as compared with those obtained under the condition A or B. For instance, for a light 650 nm in wavelength generally used in optical communication using POF as the transmission medium or in optical disk devices such as a DVD, a transmittance of 10%, 20%, and 94% were obtained for the samples prepared under conditions of A, B, and C, respectively.

As described above, the transmittance of a light in the visible region 1.5 μm or less in wavelength can be greatly improved by performing the baking of photosensitive polyimide in vacuum. In the case the light includes radiations in the wavelength region of from 400 nm to 1.2 μm, the polyimide films prepared under the conditions A and B were not feasible for practical application because the transmittance were low, but by performing baking in vacuum under the condition C, it was possible to obtain a polyimide film having a transmittance in a sufficiently useful level.

Furthermore, transmittance was measured on a sample fabricated under the condition C and then heated in air at 350° C. to find the sample to be stable, yielding the same value as that obtained under the condition C.

As shown above by the embodiment according to the present invention, an optical device was found to be easily fabricated by the use of a photosensitive, polyimide, and by performing the baking under vacuum, the transmittance can be improved. Thus, the present invention is applicable to optical waveguides and to various types of optical devices.

Then, the upper limit of the vacuum degree for improving the transmittance of the polyimide film formed by baking a photosensitive polyimide as above is described below.

By using the photosensitive polyimide (trade name HD-6100, manufactured by Hitachi Chemical—Dupont Microsystems Co. Ltd.) shown in the embodiment above, samples were prepared under the conditions D and E below to measure the transmittance thereof.

Figure 5:
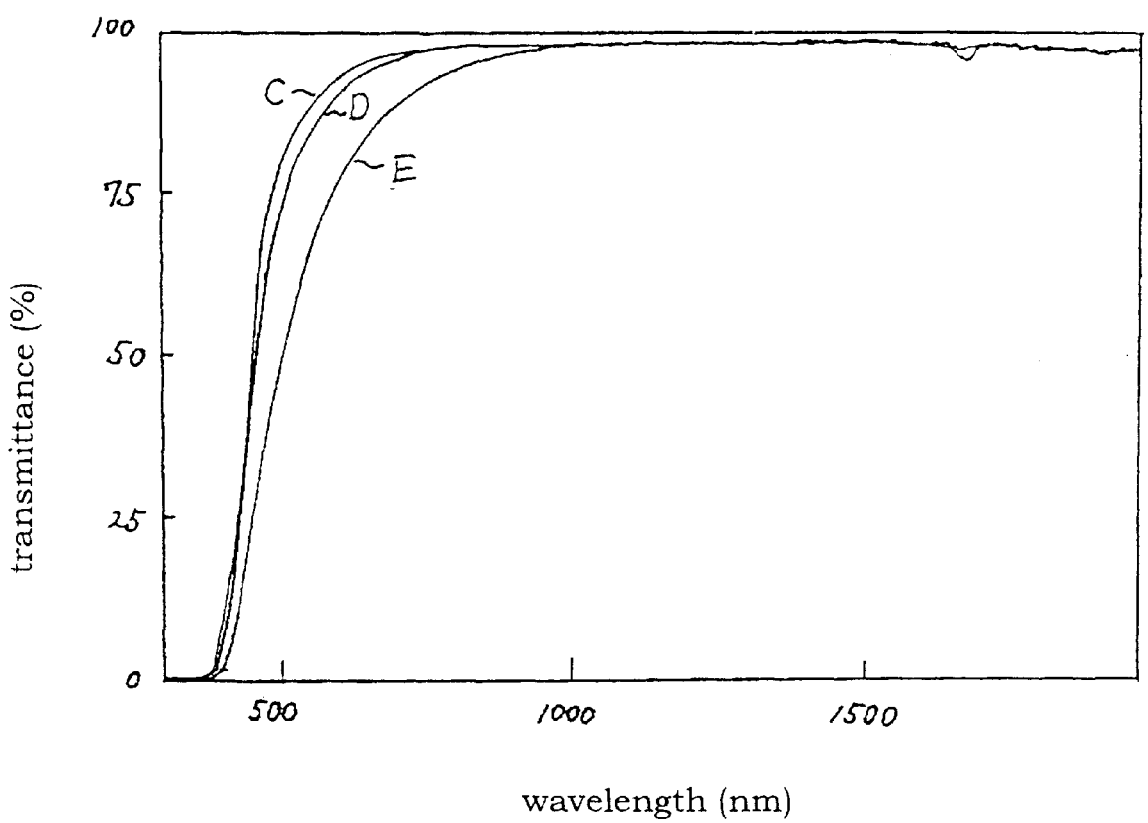
FIG. 5 is a graphical representation showing the wavelength dependence of the transmittance of photosensitive polyimide samples baked under conditions C, D and E.

(Condition D) Baking at 350° C. under vacuum of 1 Torr for 1 hour (Condition E) Baking at 350° C. under vacuum of 10 Torr for 1 hour FIG. 5 shows the measured results on the wavelength dependence of the transmittance of a photosensitive polyimide baked under the condition C (reference can be made to the first embodiment) and the conditions D and E above. It can be seen that the transmittance differs depending on the vacuum degree, on baking, and for a light 650 nm wavelength, transmittance of 94%, 93%, and 84% were obtained for the samples prepared under conditions of C, D, and E, respectively.

At a vacuum degree of 1 Torr or lower, little difference occurs on the transmittance. The polyimide obtained under a vacuum degree of 10 Torr yields a sufficiently high transmittance, and although it is practically usable, particularly preferred is to control the vacuum degree of 1 Torr or lower from the viewpoint of, for instance, the difficulty in controlling the vacuum apparatus at a high pressure.

To further investigate the reason for the change in transmittance with differing baking conditions, a sample was prepared under condition F below.

(Condition F) No baking

The non-baked sample fabricated under the condition F was subjected to infrared absorption spectroscopy by using an infrared spectrometer, Model FTS6000 manufactured by Nippon Bio-Rad Laboratories KK.

Figure 6:
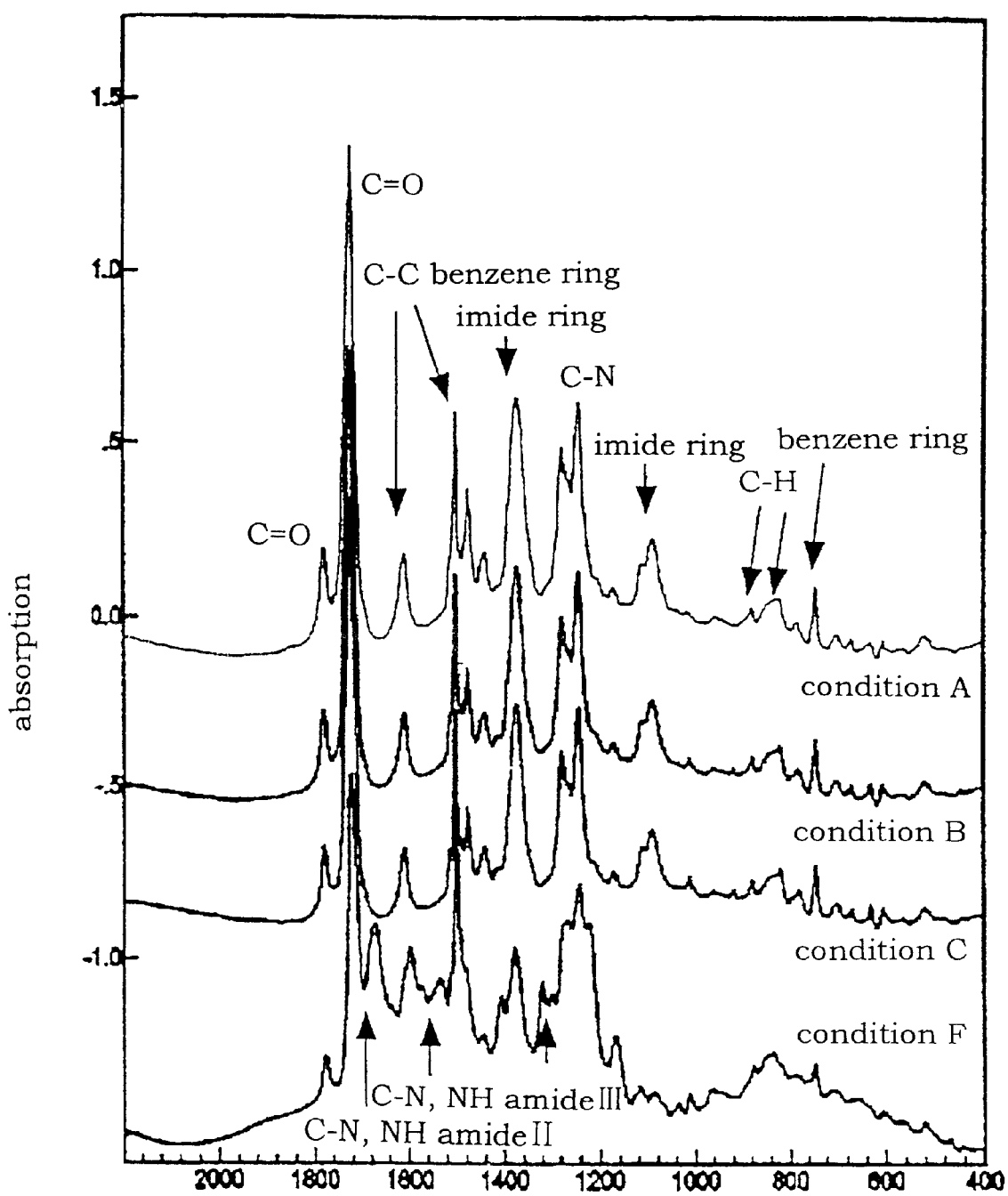
FIG. 6 is a diagram showing the infrared absorption spectra in the wavenumber for photosensitive polyimide samples fabricated under conditions A to C and F.

In FIG. 6 are shown the infrared absorption spectra (observed wavenumber range: 2,200 to 400 $cm^{-1}$; resolution: 4 $cm^{-1}$) for the photosensitive polyimides fabricated under the conditions A to C (reference can be made to the first embodiment) and F. By taking the transmittance of an infrared radiation into consideration, a high resistivity silicon was used for the substrate.

On comparing the spectra for the samples fabricated under the conditions of A to C with that fabricated without baking under condition F, it can be seen that imide rings are formed and that sufficient imidization occurred on the former samples by the dehydration cyclization reaction of polyamic acid independent to the atmospheric conditions of baking.

Furthermore, the reason why the photosensitive polyimide obtained by baking in air under the condition A undergo coloring, i.e., show decrease in transmittance, while that baked in vacuum under condition C does not. The photosensitive group used in a photosensitive polyimide is an acetophenone based tertiary amine. By taking this fact into consideration, the difference in infrared absorption spectra for the tertiary amine was investigated in further detail.

Figure 7:
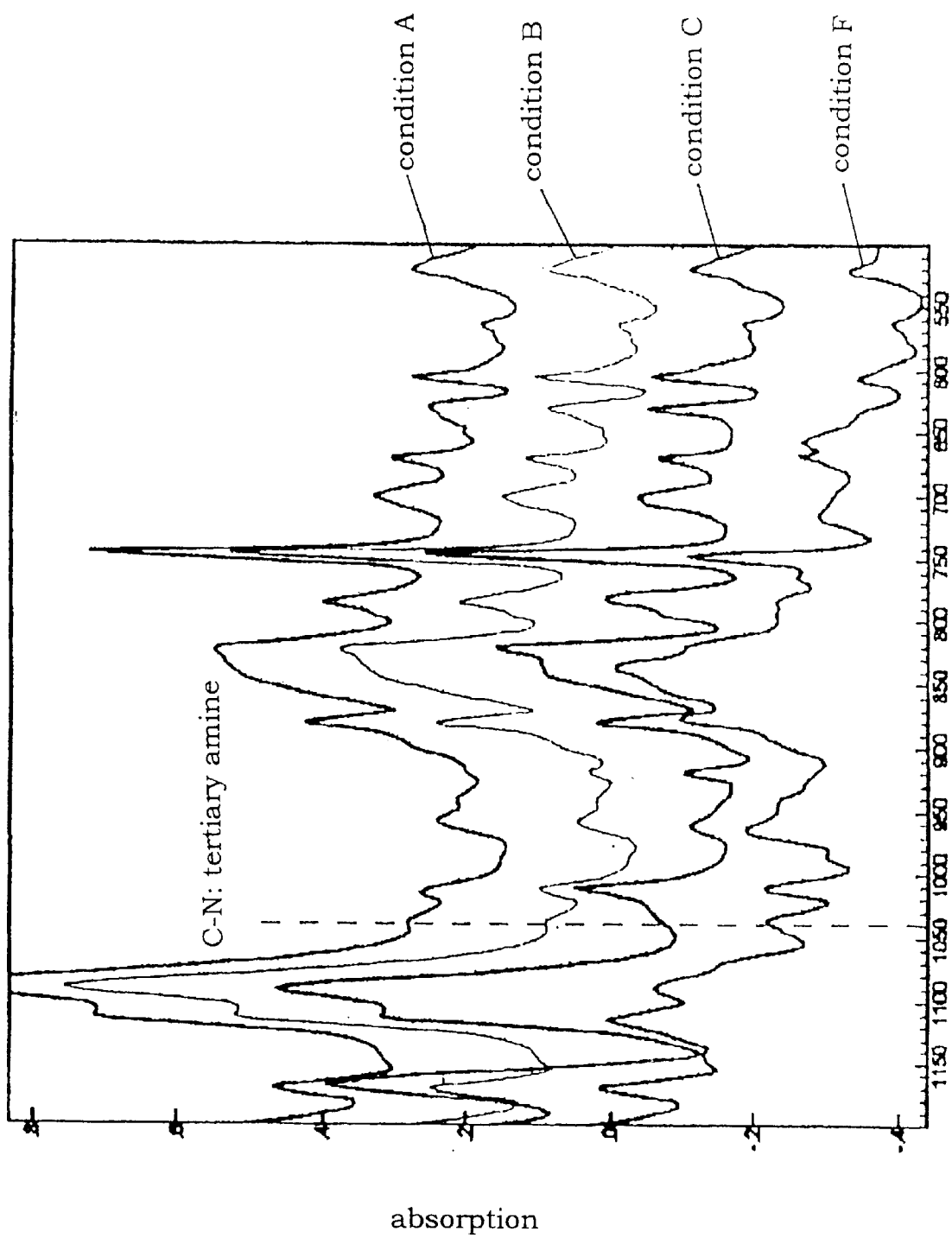
FIG. 7 is an enlarged diagram showing spectra in the wavenumber ranging from 1,200 to 500 $cm^{-1}$.

FIG. 7 shows an enlarged spectra in the wavenumber range of from 1,200 to 500 $cm^{-1}$. The absorption peak observed at ca. 1,040 $cm^{-1}$ is assigned to the C—N stretching vibration of tertiary amine (i.e., the photosensitive group), and the intensity thereof for the samples decreases in the order of the conditions F, A, B, and C. From the absorption characteristics in the visible region for the non-baked sample (i.e., the sample obtained under condition F), it is known that the photosensitive group does not contribute to the decrease in transmittance in the visible region. However, the results shown in FIG. 7 suggest that the photosensitive groups, which should be normally released and volatilized in the subsequent step of baking, undergo modification (change in bonding state) by baking and reside in the film. Such residual groups may influence the transmitting characteristics.

In the method according to the present invention, the baking step is carried out in vacuum. Presumably, the release of the photosensitive groups is accelerated by some effect to realize a state free of photosensitive groups. In this manner, the deterioration in transmittance in the visible wavelength region due to the modification of the photosensitive groups as described above is prevented from occurring.

Third Embodiment

Figure 8:
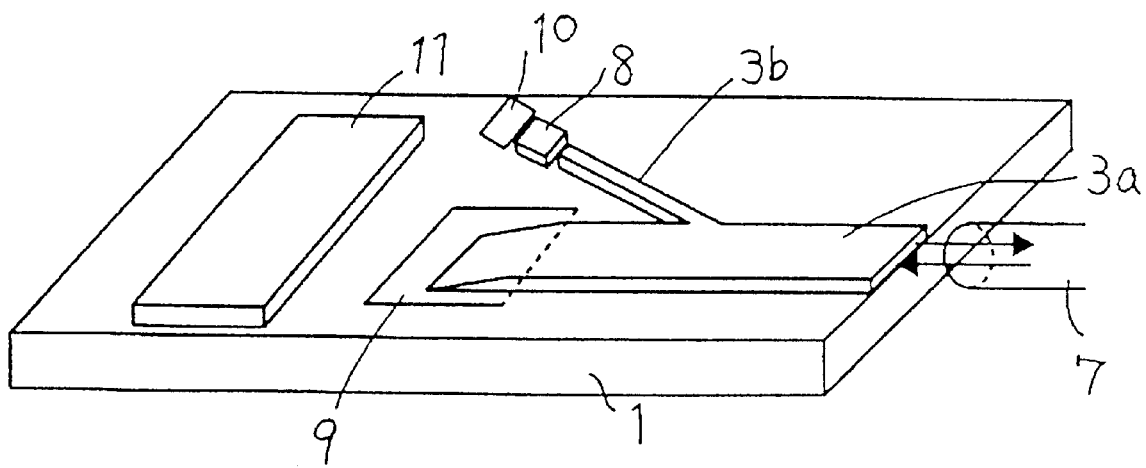
FIG. 8 is a perspective view of an optical communication device using a polyimide optical waveguide according to a third embodiment of the present invention.

FIG. 8 is a schematically drawn optical communication device using the polyimide optical waveguide according to a third embodiment of the present invention.

The optical communication device comprises, as the main components, a principal waveguide 3a which transfers the received light incident from an optical fiber 7 to a light receptor device 9 such as a photodiode, and a sub waveguide 3b which transfers the sending light emitted from a light emitting device 8 such as a semiconductor laser to the principal waveguide 3a. These waveguides are formed together with a control unit 11 which controls the light receptor device 9 and the light emitting device 8, and with a monitoring photodiode 10 which monitors the output from the light emitting device 8 on a substrate 1 made from silicon and the like. The sub waveguide 3b is coupled with the principal waveguide 3a by the side of the principal waveguide 3a. The principal waveguide 3a and the sub wave guide 3b are provided by using a polyimide optical waveguide fabricated by the production method shown by the first or the second embodiment according to the present invention.

The light emitting device 8 is controlled by the control unit 11 to emit a sending light. The sending light emitted from the light emitting device 8 is coupled with the sub waveguide 3b, and coupled with the principal waveguide 3a after being transmitted through the sub waveguide 3b. Finally, the light is transmitted through the principal waveguide 3a and coupled with the optical fiber 7. A part of the light emitted from the light emitting device 8 is received by the monitoring photodiode 10, and is controlled as such that the emission intensity at the light emitting device 8 is maintained constant. On the other hand, the received light incident from the optical fiber 7 is coupled with the principal waveguide 3a, and is coupled with the light receptor device 9 by a tapered coupler 3c comprising a principal waveguide 3a whose thickness is gradually reduced. Finally, the received light is converted into an electric signal by using the control unit 11.

As described in the first embodiment of the present invention, the principal waveguide 3a and the sub waveguide 3b having low loss and yet reduced in production cost by using a polyimide optical waveguide obtained by baking under vacuum. Thus, an optical communication device having high efficiency can be realized at low cost. Furthermore, as shown in the second embodiment according to the present invention, the production process can be simplified by using a photosensitive polyimide as the optical waveguide material. This enables an optical communication device further reduced in cost.

As the optical fiber 7, usable are the multimode optical fibers such as POF. A POF comprises a core made of a plastics such as PMMA, polycarbonate, etc., and the clad is constructed by a plastics having a refractive index lower than that of the core. The core diameter ranges from about 200 μm to 1 mm, and has a larger aperture as compared with a quartz optical fiber.

Thus, in case POF is coupled with a quartz based optical waveguide having a thickness of several micrometers, the coupling loss becomes too large. A polyimide optical waveguide can be formed relatively easily into a thick film several tens to several hundreds of micrometers in thickness, and can be coupled with a POF having a large diameter at high efficiency.

As the principal waveguide 3a and the sub waveguide 3b, the thickness thereof is preferably in a range of from 5 to 200 μm. If the waveguides are provided thinner than the thickness range above, the coupling efficiency with the POF becomes inferior, or an optical communication device having lower loss becomes available by using a quartz based optical waveguide. In the case the waveguides are provided thicker, it becomes difficult to form uniform films on the substrate 1. The polyimide film is formed by generally applying a polyimide solution to the substrate 1 by means of spin coating, and, although depending on the viscosity and the concentration of the solution, difficulties are found in obtaining a uniform film with a thickness of about 40 μm or more. Thus, to obtain a film thicker than the limit above, it is necessary to superpose a plurality of films, or to employ coating methods other than spin coating. However, even if a plurality of films are superposed, the number of films is limited to several layers. As a coating method other than spin coating, there is known a method of flow coating the substrate 1 with a polyimide solution using a doctor blade and the like. In this method again, it is difficult to obtain a uniform coating 200 μm or more in thickness due to the self weight of the polyimide solution. It can be seen from above that the film thickness which enables an optical device having a higher performance and yet capable of providing a uniform coating on the substrate 1 is limited to a range of from 5 to 200 μm.

As described above, a high performance optical communication device yet capable of production at a low cost can be obtained by using an optical waveguide described in the first and the second embodiments of the present invention. Furthermore, since the optical waveguides above can be fabricated by a semiconductor process, they can be aligned with other optical devices at high precision.

The embodiments of above are provided only as examples, and are applicable to other optical communication devices using a polyimide film formed by baking a polyimide or a photosensitive polyimide under vacuum, optical elements (e.g., optical elements such as prisms, mirrors, lenses, etc., which are assembled into an optical disk device using light flux comprising radiations ranging in the wavelength of form 400 nm to 1.2 μm), orientation controlling film of liquid crystal display devices, color filters and the protective films thereof, overcoating materials represented by the protective films for semiconductor lasers and photodiodes, and optical devices having transparent films and the like of a heat resistant laminated materials, etc.

Furthermore, because polyimide (photosensitive polyimide) excels in resistances against heat and chemicals as well as in electric insulation properties, it can be applied to the surface of an electronic component to provide a protective coating having electric insulating properties.

(III) As described above, the method for producing an optical device according to the present invention enables an optical device having excellent light transmitting properties.

Furthermore, the method for producing a polyimide film according to the present invention provides polyimide films having favorable light transmittance, yet reduced in optical loss and imparted with heat resistance. Moreover, by baking a photosensitive polyimide, an optical device can be easily produced without employing a complicated production process. More specifically, by forming an organic polymer film on a substrate and patterning it thereafter, a compact and lightweight optical device can be obtained with high precision.

While the invention has been described in detail by making reference to specific examples, it should be understood that various changes and modifications can be made without departing from the scope and the spirit of the present invention.

What is claimed is:

1. An optical device having on a substrate an organic polymer film through which a light beam is transmitted, wherein the organic polymer film is formed to have a high transmittance, such that the film has an absorptivity coefficient of light of not more than 1.6 mm$^{-1}$ in the wavelength of 650 nm said film being formed by applying a solution containing an organic polymer film-forming starting material on the substrate to form the applied film and then baking the applied film under a vacuum of 1 Torr or lower.

2. The optical device of claim 1, wherein the organic polymer film is a polyimide type resin film.

3. The optical device of claim 1, wherein the organic polymer film is a photosensitive polyimide type resin film.

4. The optical device of claim 1, wherein the organic polymer film has a thickness not less than 5 μm and not more than 200 μm.

5. The optical device of claim 1, wherein the organic polymer film is a photosensitive polyimide resin film which can transmit a light beam having a wavelength 1.5 μm or short.

6. The optical device of claim 1, wherein the organic polymer film is a polyimide film which can transmit a light beam having a wavelength of 500 nm to 800 nm.

7. The optical device of claim 1, wherein the applied film is preparatorily heated under atmospheric pressure, before the baking of the applied film under vacuum.

8. The optical device of claim 1, wherein the baking of the applied film is performed under a vacuum of $1 \times 10^{-2}$ Torr.

9. The optical device of claim 3, wherein the photosensitive polyimide type resin film is an acetophenone type resin film.

10. The optical device of claim 3, wherein the photosensitive polyimide type resin film includes a tertiary amine.

* * * * *